(12) United States Patent
Miki et al.

(10) Patent No.: US 11,402,403 B2
(45) Date of Patent: Aug. 2, 2022

(54) VEHICLE DETECTION METHOD (71) Applicant: SEIKO EPSON CORPORATION, Tokyo (JP)

(72) Inventors: Chitoshi Miki, Kawasaki (JP); Hidehiko Sekiya, Kawasaki (JP); Keishi Omori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 314 days.

(21) Appl. No.: 16/710,427

(22) Filed: Dec. 11, 2019

(65) Prior Publication Data
US 2020/0191825 A1 Jun. 18, 2020

(30) Foreign Application Priority Data

Dec. 13, 2018 (JP) .............................. JP2018-233746

(51) Int. Cl.
G01P 15/08 (2006.01)
G01D 1/12 (2006.01)
G01D 1/16 (2006.01)

(52) U.S. Cl.
CPC .... *G01P 15/0802* (2013.01); *B60W 2520/125* (2013.01); *G01D 1/12* (2013.01); *G01D 1/16* (2013.01)

(58) Field of Classification Search
CPC ......... G01P 15/0802; B60W 2520/125; G01D 1/12; G01D 1/16
See application file for complete search history.

(56) References Cited

U.S. PATENT DOCUMENTS

2009/0024336 A1* 1/2009 Tatom ................ G01G 23/3728
702/56
2021/0172828 A1* 6/2021 Kinoshita .............. G01G 19/02

FOREIGN PATENT DOCUMENTS

| CN | 107730895 A | * | 2/2018 |
| CN | 110553861 A | * | 12/2019 |
| JP | 2004523042 A | * | 4/2004 |
| JP | 2004252520 | | 9/2004 |
| JP | 2018066637 | | 4/2018 |

* cited by examiner

Primary Examiner — Mischita L Henson
(74) Attorney, Agent, or Firm — Workman Nydegger (57) ABSTRACT A vehicle detection method includes using a first sensor and a second sensor coupled to a structure to detect vibrations generated by one or more vehicles that have passed over the structure. Based on the vibrations detected by the first sensor, a first plurality of peaks are extracted, and based on the vibrations detected by the second sensor, a second plurality of peaks are extracted. Each of the first plurality of peaks and the second plurality of peaks corresponds to an axle of the one or more vehicles. The first plurality of peaks and the second plurality of peaks are then computed to determine a number of vehicles that have passed over the structure.

4 Claims, 10 Drawing Sheets

| SENSOR | FIRST AXLE | | SECOND AXLE | | THIRD AXLE | | FOURTH AXLE | |
|---|---|---|---|---|---|---|---|---|
| 2a | P5a | | P6a | | P7a | | P8a | |
| | T5a | 1061.17[sec] | T6a | 1061.33[sec] | T7a | 1061.79[sec] | T8a | 1061.81[sec] |

| SENSOR | FIRST AXLE | | SECOND AXLE | | THIRD AXLE | |
|---|---|---|---|---|---|---|
| 2b | P5b | | P6b | | P8b | |
| | T5b | 1064.25[sec] | T6b | 1064.42[sec] | T8b | 1064.93[sec] |

FIG. 6

| COMBINATION | | FIRST AXLE | | SECOND AXLE | | THIRD AXLE | |
|---|---|---|---|---|---|---|---|
| A | P5a,P6a,P7a | P5a | | P6a | | P7a | |
| | | T5a | 1061.17[sec] | T6a | 1061.33[sec] | T7a | 1061.79[sec] |
| B | P5a,P6a,P8a | P5a | | P6a | | P8a | |
| | | T5a | 1061.17[sec] | T6a | 1061.33[sec] | T8a | 1061.81[sec] |
| C | P5a,P7a,P8a | P5a | | P7a | | P8a | |
| | | T5a | 1061.17[sec] | T7a | 1061.79[sec] | T8a | 1061.81[sec] |
| D | P6a,P7a,P8a | P6a | | P7a | | P8a | |
| | | T6a | 1061.33[sec] | T7a | 1061.79[sec] | T8a | 1061.81[sec] |

FIG. 7

| | COMBINATION | FIRST AXLE | | SECOND AXLE | | THIRD AXLE | | VARIANCE VALUE |
|---|---|---|---|---|---|---|---|---|
| A | P5a,P6a,P7a | P5a | T5a | 1061.17[sec] | P6a | T6a | 1061.33[sec] | P7a | T7a | 1061.79[sec] | 0.026247 |
| | P5b,P6b,P8b | P5b | T5b | 1064.25[sec] | P6b | T6b | 1064.42[sec] | P8b | T8b | 1064.93[sec] | |
| | TIME DIFFERENCE | T5a-T5b | 3.08 | T6a-T6b | 3.09 | T7a-T8b | 3.14 | |
| B | P5a,P6a,P8a | P5a | T5a | 1061.17[sec] | P6a | T6a | 1061.33[sec] | P8a | T8a | 1061.81[sec] | 0.016997 |
| | P5b,P6b,P8b | P5b | T5b | 1064.25[sec] | P6b | T6b | 1064.42[sec] | P8b | T8b | 1064.93[sec] | |
| | TIME DIFFERENCE | T5a-T5b | 3.08 | T6a-T6b | 3.09 | T8a-T8b | 3.12 | |
| C | P5a,P7a,P8a | P5a | T5a | 1061.17[sec] | P7a | T7a | 1061.79[sec] | P8a | T8a | 1061.81[sec] | 0.222161 |
| | P5b,P6b,P8b | P5b | T5b | 1064.25[sec] | P6b | T6b | 1064.42[sec] | P8b | T8b | 1064.93[sec] | |
| | TIME DIFFERENCE | T5a-T5b | 3.08 | T7a-T6b | 2.63 | T8a-T8b | 3.12 | |
| D | P6a,P7a,P8a | P6a | T6a | 1061.33[sec] | P7a | T7a | 1061.79[sec] | P8a | T8a | 1061.81[sec] | 0.201163 |
| | P5b,P6b,P8b | P5b | T5b | 1064.25[sec] | P6b | T6b | 1064.42[sec] | P8b | T8b | 1064.93[sec] | |
| | TIME DIFFERENCE | T6a-T5b | 2.92 | T7a-T6b | 2.63 | T8a-T8b | 3.12 | |

| SENSOR | FIRST AXLE | | SECOND AXLE | | THIRD AXLE | | FOURTH AXLE | |
|---|---|---|---|---|---|---|---|---|
| 2a | P5a | | P6a | | P7a | | P8a | |
| | T5a | 1061.17[sec] | T6a | 1061.33[sec] | T7a | 1061.79[sec] | T8a | 1061.81[sec] |
| | E5a | 1.02 | E6a | 0.85 | E7a | 0.62 | E8a | 1.43 |

| SENSOR | FIRST AXLE | | SECOND AXLE | | THIRD AXLE | |
|---|---|---|---|---|---|---|
| 2b | P5b | | P6b | | P8b | |
| | T5b | 1064.25[sec] | T6a | 1064.42[sec] | T8a | 1064.93[sec] |
| | E5b | 0.90 | E6b | 0.72 | E8b | 1.26 |

FIG. 11

| COMBINATION | | FIRST AXLE | | SECOND AXLE | | THIRD AXLE | |
|---|---|---|---|---|---|---|---|
| A | P5a,P6a,P7a | P5a | | P6a | | P7a | |
| | | T5a | 1061.17[sec] | T6a | 1061.33[sec] | T7a | 1061.79[sec] |
| | | E5a | 1.02 | E6a | 0.85 | E7a | 0.62 |
| B | P5a,P6a,P8a | P5a | | P6a | | P8a | |
| | | T5a | 1061.17[sec] | T6a | 1061.33[sec] | T8a | 1061.81[sec] |
| | | E5a | 1.02 | E6a | 0.85 | E8a | 1.43 |
| C | P5a,P7a,P8a | P5a | | P7a | | P8a | |
| | | T5a | 1061.17[sec] | T7a | 1061.79[sec] | T8a | 1061.81[sec] |
| | | E5a | 1.02 | E7a | 0.62 | E8a | 1.43 |
| D | P6a,P7a,P8a | P6a | | P7a | | P8a | |
| | | T6a | 1061.33[sec] | T7a | 1061.79[sec] | T8a | 1061.81[sec] |
| | | E6a | 0.85 | E7a | 0.62 | T8b | 1.43 |

FIG. 12

| | COMBINATION | FIRST AXLE | | SECOND AXLE | | THIRD AXLE | | VARIANCE VALUE |
|---|---|---|---|---|---|---|---|---|
| A | P5a,P6a,P7a | P5a | E5a | P6a | E6a 0.85 | P7a | E7a 0.62 | 0.370075 |
| | P5b,P6b,P8b | P5b | E5b 0.9 | P6b | E6b 0.72 | P8b | E8b 1.28 | |
| | ENERGY DIFFERENCES | E5a-E5b -0.12 | | E6a-E6b -0.13 | | E7a-E8b 0.66 | | |
| B | P5a,P6a,P8a | P5a | E5a 1.02 | P6a | E6a 0.85 | P8a | E8a 1.43 | 0.012472 |
| | P5b,P6b,P8b | P5b | E5b 0.9 | P6b | E6b 0.72 | P8b | E8b 1.28 | |
| | ENERGY DIFFERENCES | E5a-E5b -0.12 | | E6a-E6b -0.13 | | E8a-E8b -0.15 | | |
| C | P5a,P7a,P8a | P5a | E5a 1.02 | P7a | E7a 0.62 | P8a | E8a 1.43 | 0.111455 |
| | P5b,P6b,P8b | P5b | E5b 0.9 | P6b | E6b 0.72 | P8b | E8b 1.28 | |
| | ENERGY DIFFERENCES | E5a-E5b -0.12 | | E7a-E6b 0.1 | | E8a-E8b -0.15 | | |
| D | P6a,P7a,P8a | P6a | E6a 0.85 | P7a | E7a 0.62 | P8a | E8a 1.43 | 0.108012 |
| | P5b,P6b,P8b | P5b | E5b 0.9 | P6b | E6b 0.72 | P8b | E8b 1.28 | |
| | ENERGY DIFFERENCES | E6a-E5b 0.05 | | E7a-E6b 0.1 | | E8a-E8b -0.15 | | |

VEHICLE DETECTION METHOD

The present application is based on, and claims priority from JP Application Serial Number 2018-223746, filed Dec. 13, 2018, the disclosure of which is hereby incorporated by reference herein in its entirety.

BACKGROUND

1. Technical Field

The present disclosure relates to a vehicle detection method.

2. Related Art

In the related art, for example, as described in JP-A-2004-252520, there is known a system including vibration sensors. When a vehicle passes near a vibration sensor, the vibration sensor detects vibrations by front wheels, and then detects vibrations by rear wheels. The detected information is combined with information from another vibration sensor provided at a certain distance. Thus, the system can estimate the number of passing vehicles by calculating a traveling speed and counting vibrations when the front wheels and the rear wheels pass.

However, in processing described in JP-A-2004-252520, it may be difficult to accurately detect axles due to an influence of disturbance such as noise and resonance. As a result, there is a problem that detection failure of a vehicle and erroneous detection of a vehicle occur.

SUMMARY

A vehicle detection method according to an aspect of the present disclosure includes: acquiring a first output of a first sensor that detects vibrations of a structure and a second output of a second sensor that detects vibrations at a location different from a location of the first sensor on the structure; detecting a plurality of peaks of the first output and detection times of the plurality of peaks of the first output; detecting a plurality of peaks of the second output and detection times of the plurality of peaks of the second output; extracting a plurality of first peaks for one vehicle moving on the structure from the plurality of peaks of the first output; extracting a plurality of second peaks for the one vehicle moving on the structure from the plurality of peaks of the second output; assuming that the number of the plurality of first peaks is n and the number of the plurality of second peaks is m, when n is larger than m, creating nCm first combinations of the peaks from the plurality of first peaks, calculating first differences between detection times of the plurality of first peaks and detection times of the plurality of second peaks in order of the detection times for each combination of the first combinations, calculating first variation indexes of the first differences for each combination of the first combinations, and selecting a combination of the peaks having the smallest first variation index among the first combinations; and when n is smaller than m, creating mCn second combinations of the peaks from the plurality of second peaks, calculating second differences between detection times of the plurality of first peaks and detection times of the plurality of second peaks in order of the detection times for each combination of the second combinations, calculating second variation indexes of the second differences for each combination of the second combinations, and selecting a combination of the peaks having the smallest second variation index among the second combinations.

The vehicle detection method may further include: calculating magnitudes of energies of the plurality of first peaks and magnitudes of energies of the plurality of second peaks; calculating, when n is larger than m, third differences between the magnitudes of the energies of the plurality of first peaks and the magnitudes of the energies of the plurality of second peaks in order of the detection times for each combination of the first combinations, and calculating third variation indexes of the third differences for each combination of the first combinations; and calculating, when n is smaller than m, fourth differences between the magnitudes of the energies of the plurality of first peaks and the magnitudes of the energies of the plurality of second peaks in order of the detection times for each combination of the second combinations, and calculating fourth variation indexes of the fourth differences for each combination of the second combinations.

In the vehicle detection method, the vehicle may have three or more axles, and the extracting the plurality of first peaks and the extracting the plurality of second peaks may include extracting the plurality of first peaks and the plurality of second peaks, which are detected within a between a minimum time and a maximum time of a time required for a plurality of the axles to pass the first sensor or the second sensor.

In the vehicle detection method, the first sensor and the second sensor may be acceleration sensors.

DESCRIPTION OF EXEMPLARY EMBODIMENTS

Hereinafter, embodiments of the present disclosure will be described with reference to the drawings. In the following drawings, a scale of each layer or each member is made different from the actual scale such that each layer or each member can be recognized.

First Embodiment

Vehicle Detection System

First, a schematic configuration of a vehicle detection system 100 according to a first embodiment will be described with reference to FIG. 1. In the present embodiment, a first sensor and a second sensor will be described as an appropriate example of an acceleration sensor. On the other hand, in addition to the acceleration sensor, an electromagnetic vibration sensor, an optical vibration sensor, or the like may be used.

Figure 1:
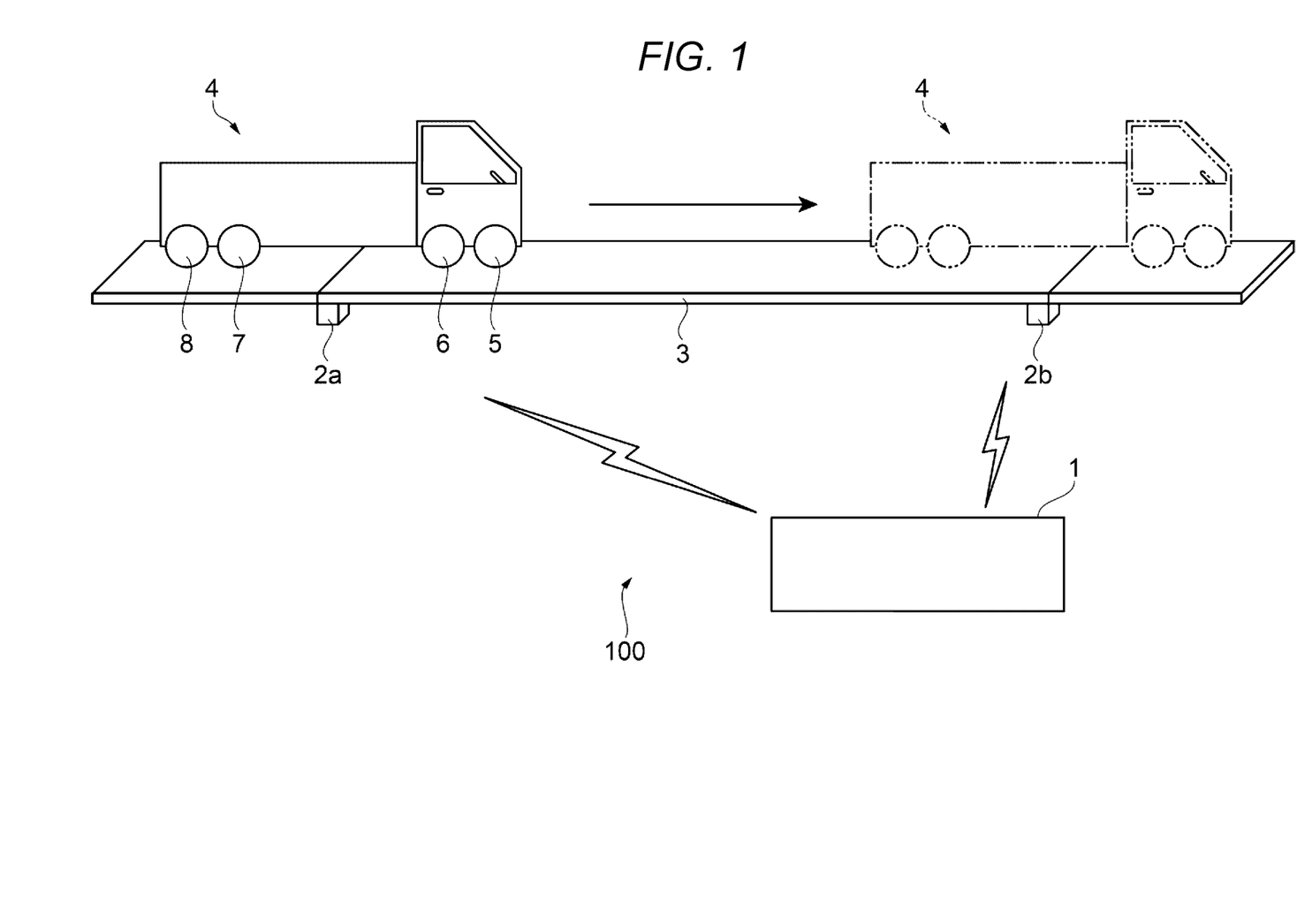
FIG. 1 is a diagram for explaining a vehicle detection system.

FIG. 1 is a schematic diagram illustrating a vehicle detection system.

As illustrated in FIG. 1, the vehicle detection system 100 includes a measurement device 1, a first acceleration sensor 2a as a first sensor, and a second acceleration sensor 2b as a second sensor. The measurement device 1 and the first acceleration sensor 2a are coupled to each other in a wired manner or a wireless manner, and can perform high-speed data communication. The measurement device 1 and the second acceleration sensor 2b are coupled to each other in a wired manner or a wireless manner, and can perform high-speed data communication. The measurement device 1 receives first detection data as a first output from the first acceleration sensor 2a and second detection data as a second output from the second acceleration sensor 2b, and can detect a vehicle 4 that moves or passes on a structure 3 such as a bridge by processing each detection data by a detection method to be described.

The first acceleration sensor 2a and the second acceleration sensor 2b are attached to the structure 3 at a certain distance. That is, the second acceleration sensor 2b is provided at a place different from the place at which the first acceleration sensor 2a is provided. The first acceleration sensor 2a is provided on a side in which a traveling vehicle 4 enters the structure 3, and the second acceleration sensor 2b is provided on a side in which vehicle 4 leaves the structure 3. The vehicle 4 traveling on the structure 3 includes four axles 5, 6, 7, and 8. Every time the axles 5, 6, 7, and 8 of the vehicle 4 pass the first acceleration sensor 2a and the second acceleration sensor 2b, vibrations occur. The first acceleration sensor 2a and the second acceleration sensor 2b detect the vibrations of the axles 5, 6, 7, and 8. By comparing the first detection data of the first acceleration sensor a and the second detection data of the second acceleration sensor 2b, it is possible to detect the vehicle 4 traveling on the structure 3. In the present embodiment, a case where the number of axles of the vehicle 4 is four is described as an example. On the other hand, the present disclosure is not limited thereto, and the number of axles may be three or more. In the present embodiment, a minimum time is described as a minimum axle passage time, and a maximum time is described as a maximum axle passage time.

Vehicle Detection Method

Next, a vehicle detection method according to the first embodiment will be described with reference to FIGS. 2 to 7.

Figure 2:
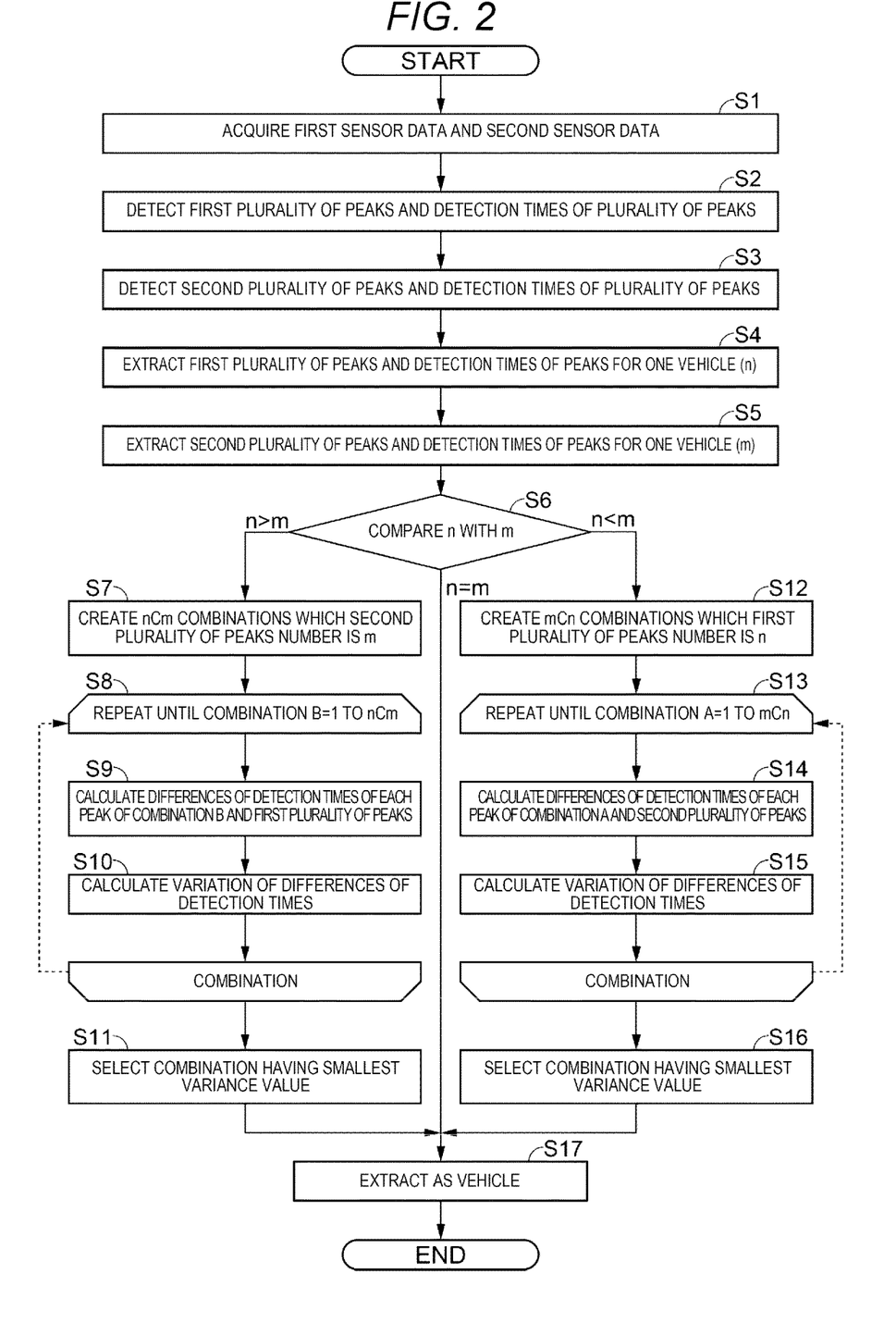
FIG. 2 is a flowchart from axle detection to vehicle detection according to a first embodiment.
Figure 3:
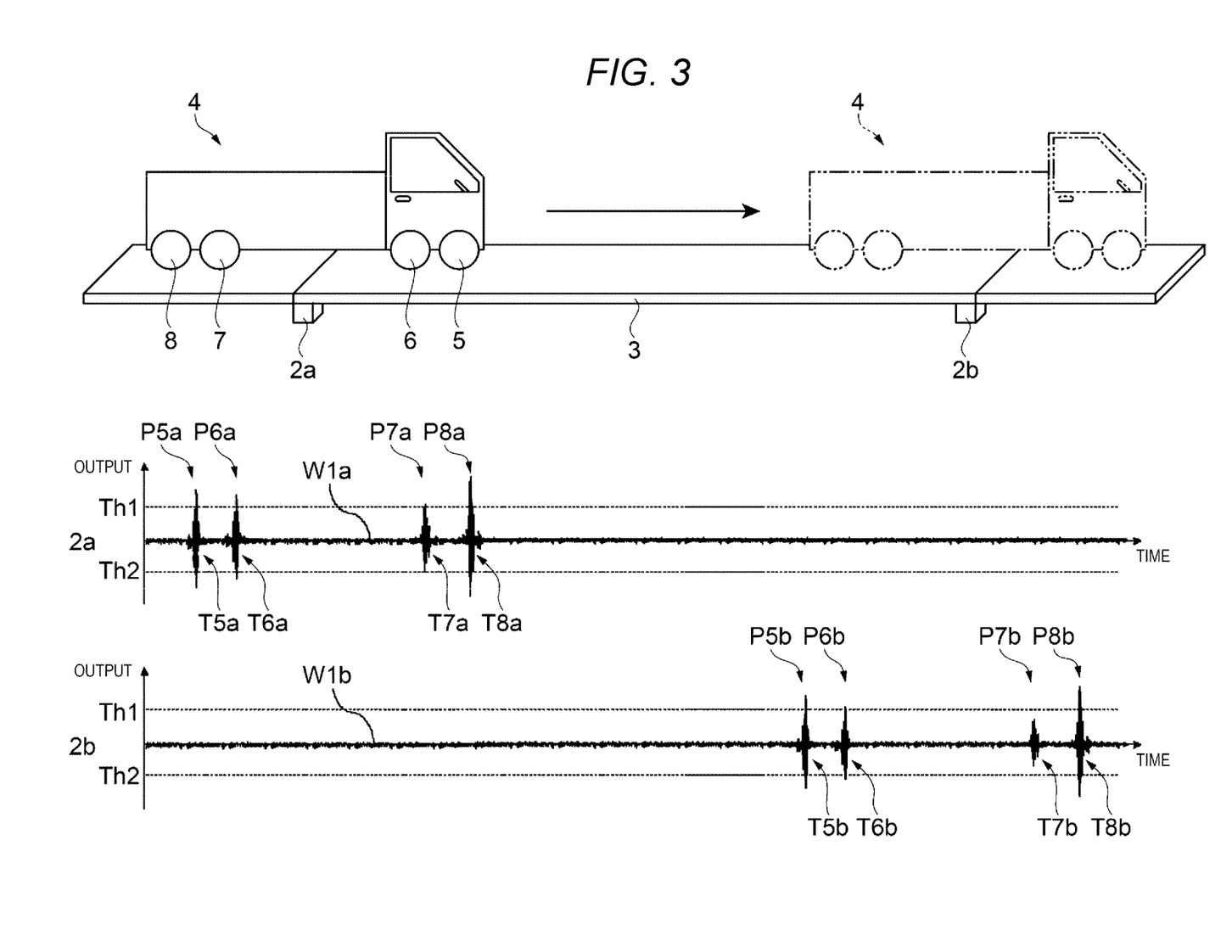
FIG. 3 is a diagram for explaining an example of a sensor output when a vehicle passes.
Figure 4:
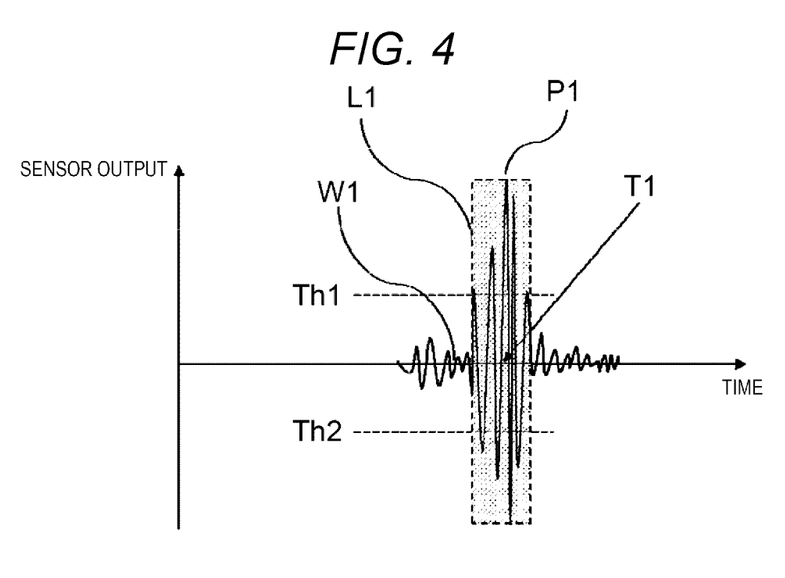
FIG. 4 is a diagram for explaining an axle passage time from the sensor output.
Figure 5:
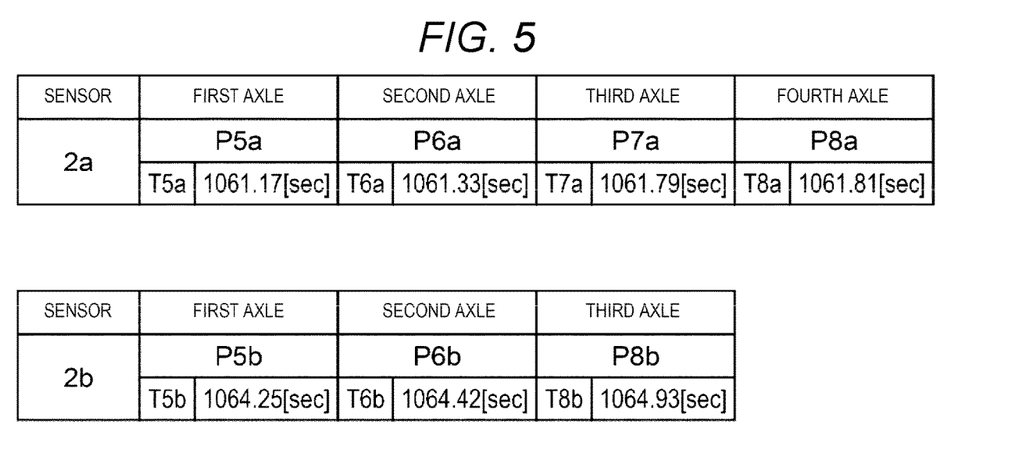
FIG. 5 is a diagram for explaining axle passage times when the vehicle passes.
Figure 6:
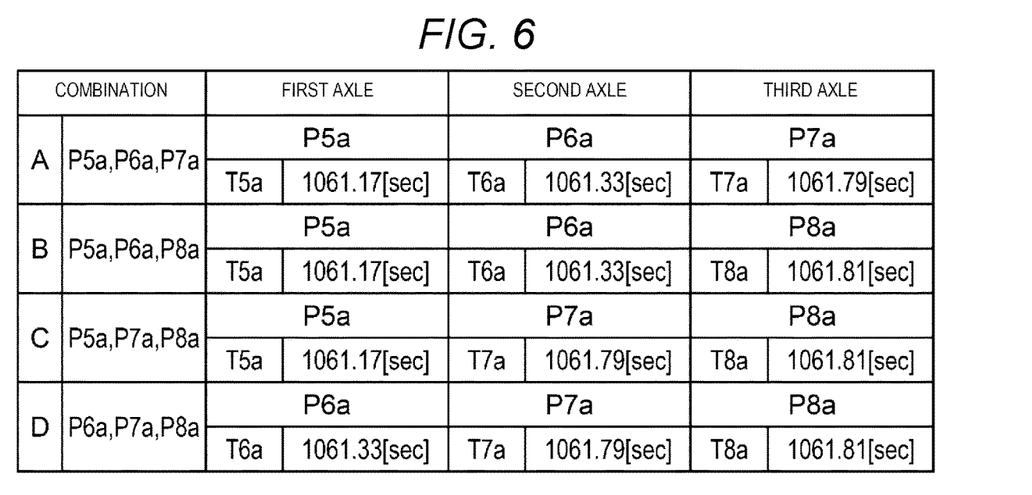
FIG. 6 is a diagram for explaining creation of combinations of a plurality of peaks.
Figure 7:
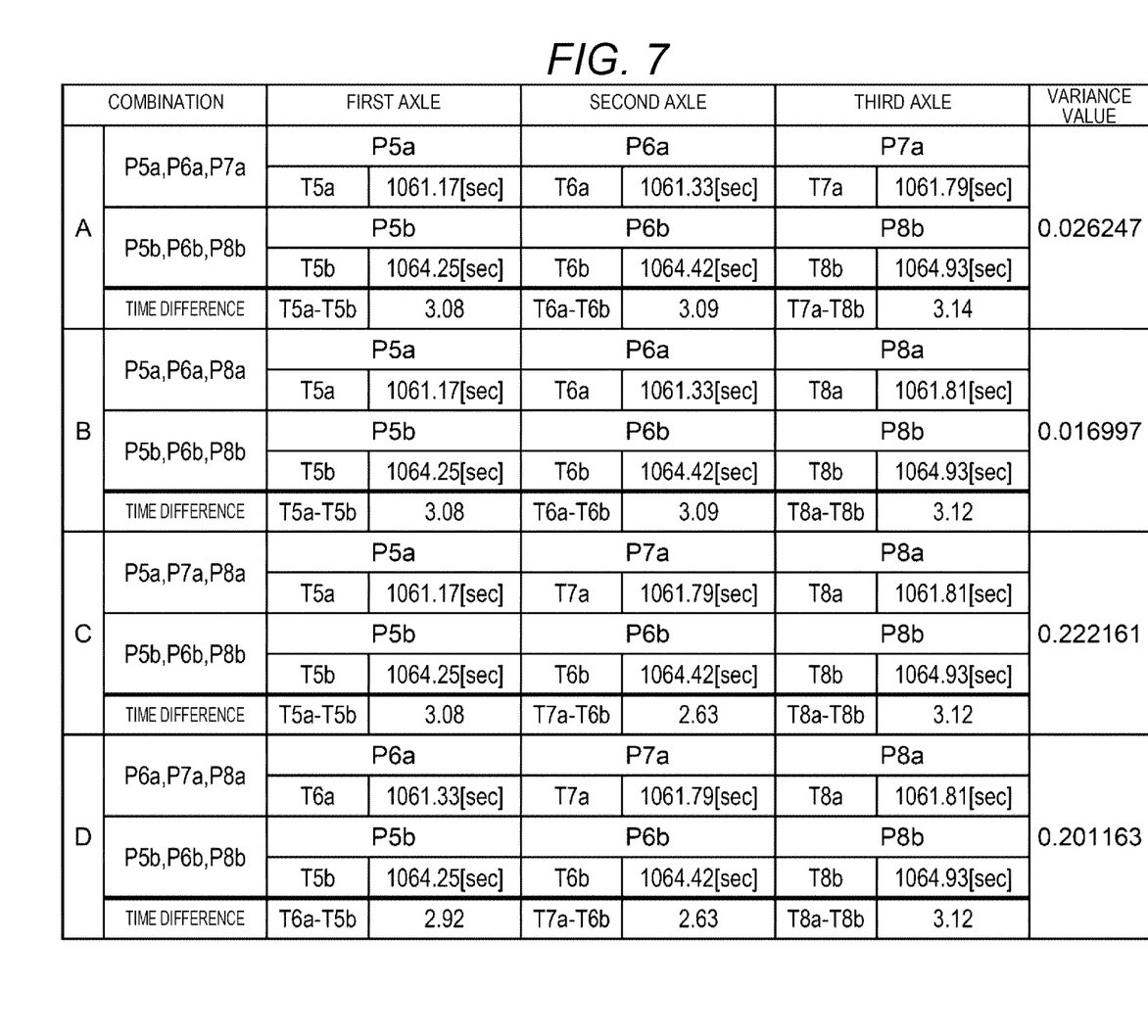
FIG. 7 is a diagram for explaining derivation of time differences and variance values of the time differences.

FIG. 2 is a flowchart illustrating a vehicle detection method according to the first embodiment. FIG. 3 is a diagram for explaining an example of a sensor output when a vehicle passes. FIG. 4 is a diagram for explaining an axle passage time from the sensor output. FIG. 5 is a diagram for explaining axle passage times when the vehicle passes. FIG. 6 is a diagram for explaining creation of combinations of a plurality of peaks. FIG. 7 is a diagram for explaining derivation of time differences and variance values of the time differences.

As illustrated in FIG. 2, in the vehicle detection method according to the first embodiment, first, in step S1, the measurement device 1 acquires the first detection data and the second detection data by receiving the first detection data as the first output, which is detected when the vehicle 4 traveling on the structure 3 passes the first acceleration sensor 2a, and the second detection data as the second output, which is detected when the vehicle 4 traveling on the structure 3 passes the second acceleration sensor 2b in the same manner.

As illustrated in FIG. 3, each of the first detection data W1$a$ and the second detection data W1$b$ includes peaks corresponding to the four axles 5, 6, 7, and 8 when the vehicle 4 passes the first acceleration sensor 2a and the second acceleration sensor 2b and detection times when the peaks are detected.

Further, filter processing is performed on the acquired first detection data W1$a$ and the acquired second detection data W1$b$ in order to remove noise and excessive vibrations. As an example, band pass filter processing of 40 Hz to 100 Hz may be performed.

Next, in step S2, from the first detection data W1$a$ detected by the first acceleration sensor 2a, peaks of vibrations caused by the axles 5, 6, 7, and 8 passing the first acceleration sensor 2a and detection times of the peaks are detected. In the example illustrated in FIG. 3, a plurality of detection peaks P5$a$, P6$a$, P7$a$, and P8$a$, which correspond to the axles 5, 6, 7, and 8 and have magnitudes exceeding a threshold value Th1 and a threshold value Th2 of the first detection data W1$a$, and detection times T5$a$, T6$a$, T7$a$, and T8$a$ of the peaks are detected. Further, as illustrated in FIG. 4, in a method of detecting peaks of vibrations caused by passage of the axles, a peak P1 having a maximum sensor output in a section L1 exceeding the threshold value Th1 and the threshold value Th2 is set as a detection peak, and a time T1 when the peak P1 is detected is set as a detection time.

Next, in step S3, from the second detection data W1$b$ detected by the second acceleration sensor 2b, peaks of vibrations caused by the axles 5, 6, 7, and 8 passing the second acceleration sensor 2b and detection times of the peaks are detected. In the example illustrated in FIG. 3, except for the peak which corresponds to the axle 7 and has a magnitude not exceeding the threshold value Th1 and the threshold value Th2, a plurality of detection peaks P5$b$, P6$b$, and P8$b$, which correspond to the axles 5, 6, and 8 and have magnitudes exceeding the threshold value Th1 and the threshold value Th2, and detection times T5$b$, T6$b$, and T8$b$ of the peaks are detected. The method of detecting the peaks of vibrations caused by passage of the axles is the same as the method of detecting the peaks from the detection data of the first acceleration sensor 2a.

Next, in step S4, from the plurality of peaks and the detection times of the peaks in the first detection data W1$a$, which are detected in step S2, the plurality of peaks and the detection times of the peaks in the first detection data W1$a$ for one vehicle are extracted. Here, n is the number of the peaks extracted in step S4. In the extraction method for one vehicle, a minimum speed Vmin and a maximum speed Vmax in passage of the vehicle and a shortest axle length Lmin and a longest axle length Lmax in the vehicle are defined, a "minimum axle passage time Tmin=Lmax/Vmin" and a "maximum axle passage time Tmax=Lmin/Vmax" are calculated.

When X is a positive integer, in a case where a time difference ΔT from a detection time of an X-th peak to a detection time of a next (X+1)-th peak is minimum axle passage time≤ΔT≤maximum axle passage time, the X-th peak is added to the plurality of peaks for one vehicle. In a case of time difference ΔT<minimum axle passage time, two axles are regarded as the same, and thus the X-th peak is not added to the plurality of peaks for one vehicle. In a case of time difference ΔT>maximum axle passage time, the plurality of peaks for one vehicle are determined and extracted. In the example illustrated in FIG. 5, the peaks P5a, P6a, P7a, and P8a and the detection times T5a, T6a, T7a, and T8a of the peaks, which are extracted from vibrations for one vehicle in the first detection data W1a, are listed, and the number of extracted peaks is four.

Next, in step S5, from the plurality of peaks and the detection times of the peaks in the second detection data W1b, which are detected in step S3, in the same manner as in step S4, the plurality of peaks and the detection times of the peaks in the second detection data W1b for one vehicle are extracted. Here, m is the number of the peaks extracted in step S5. In the example illustrated in FIG. 5, the peaks P5b, P6b, and P8b, and the detection times T5b, T6b, and T8b of the peaks which are extracted from vibrations for one vehicle in the second detection data W1b, are listed, and the number of extracted peaks is three.

Next, in step S6, the number n of peaks extracted in step S4 is compared with the number m of peaks extracted in step S5, and when n and m are equal, the process proceeds to step S17. In a case of n>m, the process proceeds to step S7. In a case of n<m, the process proceeds to step S12.

In a case of n=m, in step S17, the plurality of peaks of the first detection data W1a and the plurality of peaks of the second detection data W1b are regarded as belonging to the same vehicle, and are extracted as the peaks for one vehicle.

The flow of the vehicle detection method is ended.

In a case of n>m, in step S7, from the plurality of peaks of the first detection data W1a, nCm first combinations, which are combinations of the plurality of peaks of the first detection data W1a, are created such that the number of peaks is m. Here, nCm is a symbol representing the number of combinations, and a combination aCr for extracting r elements from a elements is expressed by Equation (1).

$$aCr = \frac{a!}{r!(a-r)!} \quad (1)$$

In the example illustrated in FIG. 5, since n=4 and m=3, the number of combinations is four.

In the example illustrated in FIG. 6, there are four combinations of the plurality of peaks. Four combinations of a combination A including P5a, P6a, and P7a, a combination B including P5a, P6a, and P8a, a combination C including P5a, P7a, and P8a, and a combination D including P6a, P7a, and P8a are created.

Next, in step S8, one set is selected from the nCm combinations A to D of the plurality of peaks of the first detection data W1a, which are created in step S7, and until all the nCm combinations are selected, steps up to step S10 are repeated.

Next, in step S9, in the one set selected in step S8, first differences from the detection times of the plurality of peaks of the first detection data W1a to the detection times of the plurality of peaks of the second detection data W1b are calculated in order of the detection times. In the example illustrated in FIG. 7, differences from the detection times of each of the combinations A to D of the plurality of peaks of the first detection data W1a illustrated in FIG. 6 to the detection times of the plurality of peaks of the second detection data W1b for one vehicle illustrated in FIG. 5 are calculated. Taking the combinations A to D illustrated in FIG. 6 as an example, in the combination A, a difference between T5a and T5b in the first axle, a difference between T6a and T6b in the second axle, and a difference between T7a and T8b in the third axle are calculated. In the combination B, a difference between T5a and T5b in the first axle, a difference between T6a and T6b in the second axle, and a difference between T8a and T8b in the third axle are calculated. In the combination C, a difference between T5a and T5b in the first axle, a difference between T7a and T6b in the second axle, and a difference between T8a and T8b in the third axle are calculated. In the combination D, a difference between T6a and T5b in the first axle, a difference between T7a and T7b in the second axle, and a difference between T8a and T8b in the third axle are calculated.

Next, in step S10, a variance is calculated as a first variation index of the differences of the plurality of detection times calculated in step S9. The variance of the differences of the detection times of each combination can be calculated by Equation (2).

$$\sigma^2 = \frac{1}{n}\sum_{i=1}^{n}(x_i - \mu)^2 \quad (2)$$

Here, $\sigma^2$ is a variance, i is a positive integer, $x_i$ is each of difference values, and $\mu$ is an average of the difference values.

In the present embodiment, a variance is calculated as an example of a variation index. On the other hand, an index other than a variance may be used as long as a degree of variation is obtained. For example, a standard deviation may be calculated.

In the example illustrated in FIG. 7, variance values of the difference values of the plurality of detection times in the axles of the combinations A to D of the plurality of peaks of the first detection data W1a are calculated. The variance value of the combination A is 0.026247, the variance value of the combination B is 0.016997, the variance value of the combination C is 0.222161, and the variance value of the combination D is 0.201163.

Next, in step S11, the combination having the smallest variance value among a plurality of variance values obtained in step S7 to step S10 is selected. In the example illustrated in FIG. 7, the combination B having the smallest variance value of 0.016997 is selected as the plurality of peaks of the first detection data W1a for one vehicle.

Next, in step S17, the plurality of peaks of the first detection data W1a and the plurality of peaks of the second detection data W1b are regarded as belonging to the same vehicle, and are extracted as the peaks for one vehicle.

The flow of the vehicle detection method is ended.

In a case of n<m, in step S12, from the plurality of peaks of the second detection data W1b, mCn second combinations, which are combinations of the plurality of peaks of the second detection data W1b, are created such that the number of peaks is n.

Next, in step S13, one set is selected from the mCn combinations of the plurality of peaks of the second detection data W1$b$, which are created in step S12, and until all the mCn combinations are selected, steps up to step S15 are repeated.

Next, in step S14, in the one set selected in step S13, second differences from the detection times of the plurality of peaks of the second detection data W1$b$ to the detection times of the plurality of peaks of the first detection data W1$a$ are calculated in order of the detection times.

Next, in step S15, a variance is calculated as a second variation index of the differences of the plurality of detection times calculated in step S14.

Next, in step S16, the combination having the smallest variance value among a plurality of variance values obtained in step S13 to step S15 is selected.

Next, in step S17, the plurality of peaks of the first detection data W1$a$ and the plurality of peaks of the second detection data W1$b$ are regarded as belonging to the same vehicle, and are extracted as the peaks for one vehicle.

The flow of the vehicle detection method is ended.

According to the vehicle detection method as described above, when the number n of a plurality of first peaks is different from the number m of a plurality of second peaks due to an influence of disturbance such as noise and resonance, by developing mCn or nCm combinations, calculating differences between the detection times of the plurality of first peaks and the detection times of the plurality of second peaks in order of the detection times for each of the combinations of the peaks, and calculating a variance value of the differences, the most appropriate combination can be selected, and thus it is possible to detect that the vehicle 4 detected by the first acceleration sensor 2$a$ and the vehicle 4 detected by the second acceleration sensor 2$b$ are the same. Therefore, erroneous detection of the vehicle 4 and detection failure of the vehicle 4 can be reduced. Accordingly, it is possible to detect the vehicle with high accuracy.

Further, in the step of extracting the plurality of first peaks and the step of extracting the plurality of second peaks, the plurality of first peaks and the plurality of second peaks for one vehicle can be extracted based on a limitation by the minimum axle passage time and the maximum axle passage time. Thus, in the combination processing, errors in the number of peaks can be reduced. Therefore, it is possible to detect the vehicle with higher accuracy.

Furthermore, the acceleration sensors 2$a$ and 2$b$ having a sensitivity higher than that of another sensor are used, and thus data can be acquired at a high sampling frequency. Therefore, even when a traveling speed of the vehicle 4 is fast, the axles can be detected, and thus it is possible to detect the vehicle with higher accuracy.

Second Embodiment

Vehicle Detection Method

Figure 8:
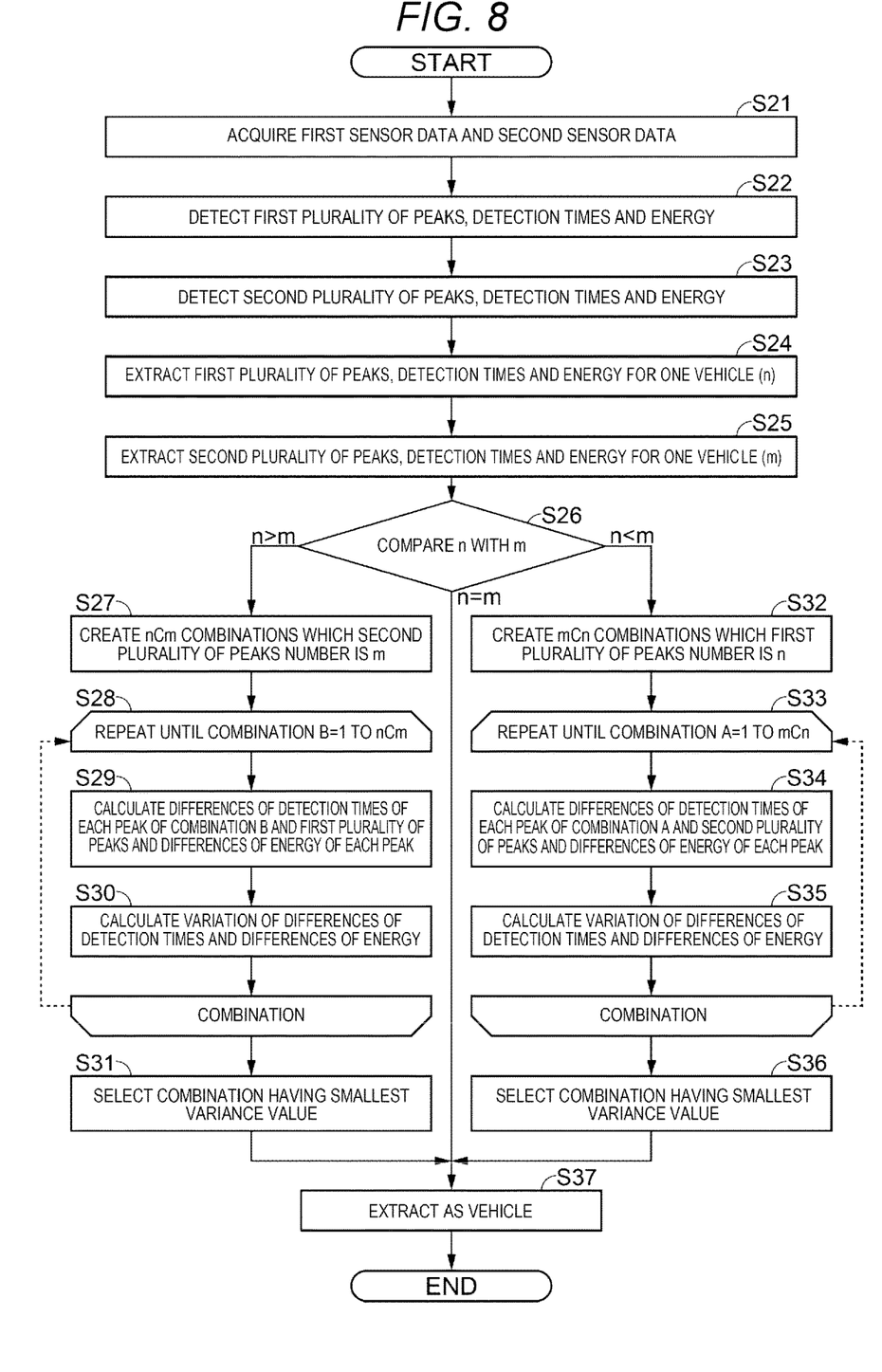
FIG. 8 is a flowchart from axle detection to vehicle detection according to a second embodiment.
Figure 9:
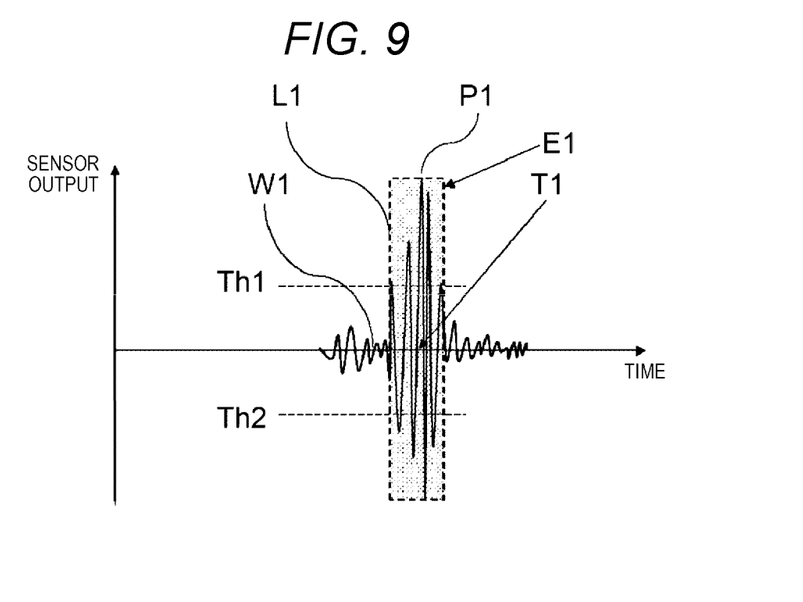
FIG. 9 is a diagram for explaining calculation of an energy when a vehicle passes.
Figure 10:
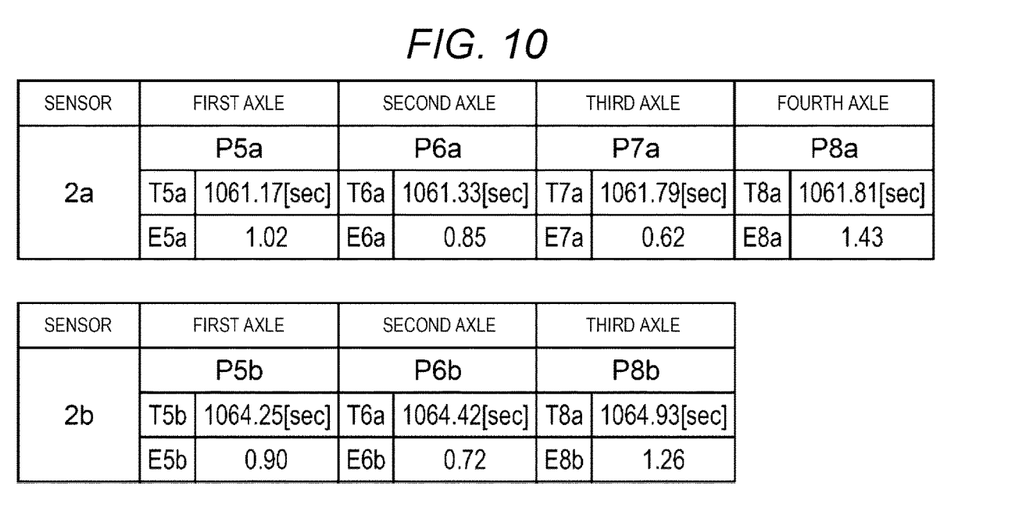
FIG. 10 is a diagram for explaining energies from a sensor output.
Figure 11:
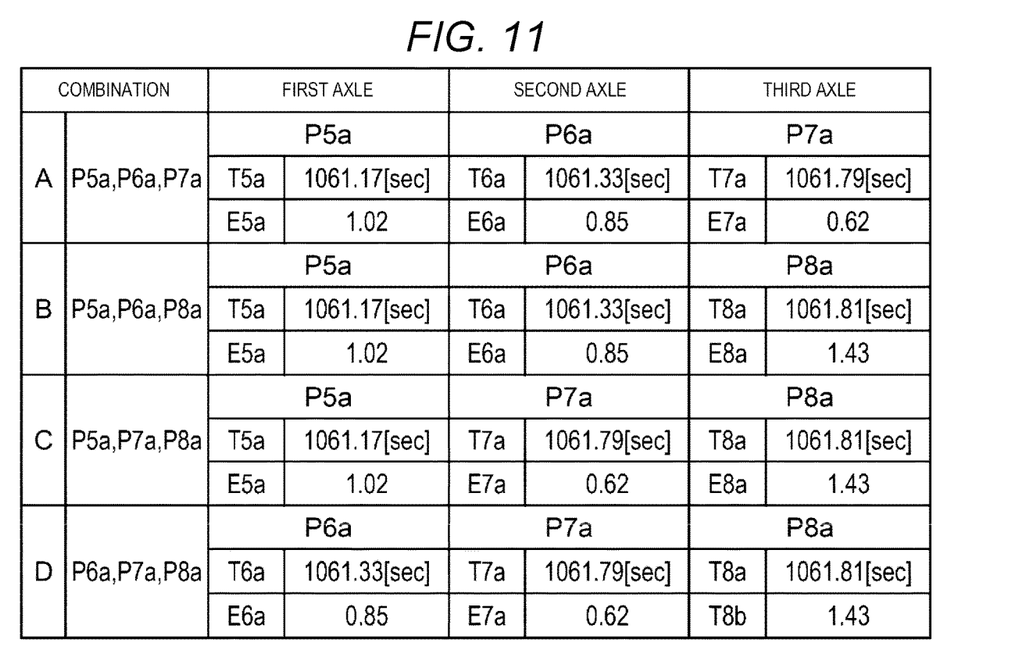
FIG. 11 is a diagram for explaining combinations of a plurality of peaks.
Figure 12:
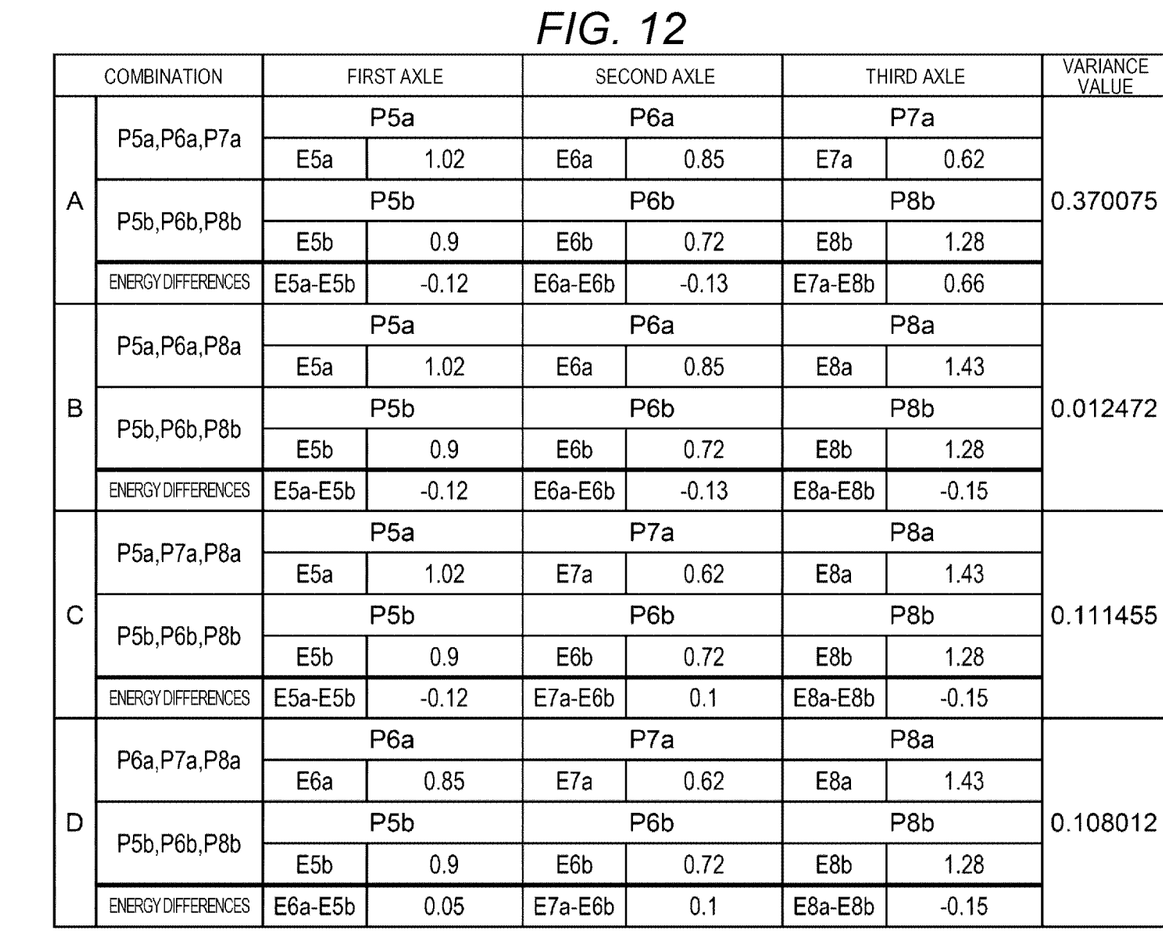
FIG. 12 is a diagram for explaining derivation of energy differences and variance values.

Next, a vehicle detection method according to a second embodiment will be described with reference to FIG. 8 to FIG. 12. FIG. 8 is a flowchart from axle detection to vehicle detection according to the second embodiment. FIG. 9 is a diagram for explaining calculation of energy in a vehicle passage example. FIG. 10 is a diagram for explaining energy from sensor output. FIG. 11 is a diagram for explaining combinations of a plurality of peaks. FIG. 12 is a diagram for explaining derivation of energy differences and a variance value.

As illustrated in FIG. 8, in the vehicle detection method according to the second embodiment, first, in step S21, similar to step S1 of the first embodiment, the measurement device 1 acquires the first detection data W1$a$ and the second detection data W1$b$ by receiving the first detection data W1$a$, which is detected when the vehicle 4 traveling on the structure 3 passes the first acceleration sensor 2$a$, and the second detection data W1$b$, which is detected when the vehicle 4 traveling on the structure 3 passes the second acceleration sensor 2$b$ in the same manner.

Further, filter processing is performed on the acquired first detection data W1$a$ and the acquired second detection data W1$b$ in order to remove noise and excessive vibrations. As an example, band pass filter processing of 40 Hz to 100 Hz may be performed.

Next, in step S22, from the first detection data W1$a$ detected by the first acceleration sensor 2$a$, peaks of vibrations caused by the axles 5, 6, 7, and 8 passing the first acceleration sensor 2$a$, detection times of the peaks, and energy values of the peaks are detected. In a method of detecting peaks of vibrations caused by passage of the axles and detection times of the peaks, similar to step S2 of the first embodiment, a peak P1 having a maximum sensor output in a section L1 exceeding the threshold value Th1 and the threshold value Th2 is set as a detection peak, and a time T1 when the peak P1 is detected is set as a detection time. In addition, in a method of detecting energy values of the peaks of vibrations caused by passage of the axles, as illustrated in FIG. 9, the sum of absolute values of waveform data in the section L1 of the detection data W1 is set as an energy E1.

Next, in step S23, from the second detection data W1$b$ detected by the second acceleration sensor 2$b$, peaks of vibrations caused by the axles 5, 6, 7, and 8 passing the second acceleration sensor 2$b$, detection times of the peaks, and energy values of the peaks are detected. Similar to step S3 of the first embodiment, except for the detection peak P7$b$, which corresponds to the axle 7 and has a magnitude not exceeding the threshold value Th1 and the threshold value Th2, and the detection time T7$b$ of the detection peak P7$b$, the plurality of detection peaks P5$b$, P6$b$, and P8$b$, which correspond to the axles 5, 6, and 8 and have magnitudes exceeding the threshold value Th1 and the threshold value Th2, detection times T5$b$, T6$b$, and T8$b$ of the peaks, and energies E5$b$, E6$b$, and E8$b$ are detected. The method of detecting the peaks of vibrations caused by passage of the axles is the same as the method of detecting the peaks from the detection data of the first acceleration sensor 2$a$.

Next, in step S24, from the plurality of peaks and the detection times of the peaks in the first detection data W1$a$, which are detected in step S22, the plurality of peaks, the detection times of the peaks, and the energy values of the peaks in the first detection data W1$a$ for one vehicle are extracted. Here, n is the number of the peaks extracted in step S24. The extraction method for one vehicle is the same as the method of step S4 of the first embodiment. In the example illustrated in FIG. 10, the peaks P5$a$, P6$a$, P7$a$, and P8$a$, the detection times T5$a$, T6$a$, T7$a$, and T8$a$ of the peaks, and the energies E5$a$, E6$a$, E1$a$, and E8$a$ of the peaks, which are extracted from vibrations for one vehicle in the first detection data W1$a$, are listed, and the number of extracted peaks is four.

Next, in step S25, from the plurality of peaks and the detection times of the peaks in the second detection data W1$b$, which are detected in step S23, similar to step S24, the plurality of peaks, the detection times of the peaks, and the energy values of the peaks in the second detection data W1$b$ for one vehicle are extracted. Here, m is the number of peaks extracted in step S25. In the example illustrated in FIG. 10, the peaks P5$b$, P6$b$, and P8$b$, the detection times T5$b$, T6$b$, and T8$b$ of the peaks, and the energies E5$b$, E6$b$, and E8b of the peaks which are extracted from vibrations for one vehicle in the second detection data W1b, are listed, and the number of extracted peaks is three.

Next, in step S26, the number n of peaks extracted in step S24 is compared with the number m of peaks extracted in step S25, and when n and m are equal, the process proceeds to step S37. In a case of n>m, the process proceeds to step S27. In a case of n<m, the process proceeds to step S32.

In a case where n and m are equal, in step S37, the plurality of peaks of the first detection data W1a and the plurality of peaks of the second detection data W1b are regarded as belonging to the same vehicle, and are extracted as the peaks for one vehicle. Then, the flow of vehicle detection is ended.

In a case of n>m, in step S27, from the plurality of peaks of the first detection data W1a, nCm first combinations, which are combinations of the plurality of peaks of the first detection data W1a, are created such that the number of peaks is m.

In the example illustrated in FIG. 10, since n=4 and m=3, the number of combinations is four.

In the example illustrated in FIG. 11, there are four combinations of the plurality of peaks. Four combinations of a combination A including P5a, P6a, and P7a, a combination B including P5a, P6a, and P7a, a combination C including P5a, P7a, and P8a, and a combination D including P6a, P7a, and P8a are created.

Next, in step S28, one set is selected from the nCm combinations of the plurality of peaks of the first detection data W1a, which are created in step S27, and until all the nCm combinations are selected, steps up to step S30 are repeated.

Next, in step S29, in the one set selected from the combinations in step S28, differences in detection time and third differences as differences in energy are calculated in order of the detection times, the differences in detection time being differences from the detection times of the plurality of peaks of the first detection data W1a to the detection times of the plurality of peaks of the second detection data W1b, and the third differences being differences from the energies of the plurality of peaks of the first detection data W1a to the energies of the plurality of peaks of the second detection data W1b. Since the method of calculating the differences in detection time is described in the first embodiment, a description thereof will be omitted. In the example illustrated in FIG. 12, differences in energy from the energies of each of the combinations A to D of the plurality of peaks of the first detection data W1a illustrated in FIG. 11 to the energies of the plurality of peaks of the second detection data W1b for one vehicle illustrated in FIG. 10 are calculated. Taking the combinations A to D illustrated in FIG. 12 as an example, in the combination A, a difference between E5a and E5b in the first axle, a difference between E6a and E6b in the second axle, and a difference between E7a and E8b in the third axle are calculated. In the combination B, a difference between E5a and E5b in the first axle, a difference between E6a and E6b in the second axle, and a difference between E8a and E8b in the third axle are calculated. In the combination C, a difference between E5a and E5b in the first axle, a difference between E7a and E6b in the second axle, and a difference between E8a and E8b in the third axle are calculated. In the combination D, a difference between E6a and E5b in the first axle, a difference between E7a and E6b in the second axle, and a difference between E8a and E8b in the third axle are calculated.

Next, in step S30, from the differences of the plurality of detection times and the differences of the plurality of energies calculated in step S29, a variance of the differences of the plurality of detection times and a variance as a third variation index of the differences of the plurality of energies are calculated. Since the method of calculating the variance of the differences of the plurality of detection times is described in the first embodiment, a description thereof will be omitted. In the example illustrated in FIG. 12, a variance value of the difference values of the plurality of energies in the axles of the combinations A to D of the plurality of peaks of the first detection data W1a is calculated. The variance value of the combination A is 0.370075, the variance value of the combination B is 0.012472, the variance value of the combination C is 0.111455, and the variance value of the combination D is 0.108012.

In the present embodiment, a variance is calculated as an example of a variation index. On the other hand, an index other than a variance may be used as long as a degree of variation is obtained. For example, a standard deviation may be calculated.

Next, in step S31, the combination, which has the smallest variance value among the plurality of variance values of the detection times and the plurality of variance values of the energies obtained in step S27 to step S30, is selected. As illustrated in FIG. 7, the combination B having the smallest variance value of the detection times is selected as in step S11 of the first embodiment. In the example illustrated in FIG. 12, the combination B having the smallest variance value 0.012472 of the energies is selected as the plurality of peaks of the first detection data W1a for one vehicle.

In a case of n<m, in step S32, from the plurality of peaks of the second detection data W1b, mCn second combinations, which are combinations of the plurality of peaks of the second detection data W1b, are created such that the number of peaks is n.

Next, in step S33, one set is selected from the mCn combinations of the plurality of peaks of the second detection data W1b, which are created in step S32, and until all the mCn combinations are selected, steps up to step S35 are repeated.

Next, in step S34, in the one set selected from the combinations in step S33, differences in detection time and fourth differences as differences in energy are calculated in order of the detection times, the differences in detection time being differences from the detection times of the plurality of peaks of the second detection data W1b to the detection times of the plurality of peaks of the first detection data W1a, and the fourth differences being differences from the energies of the plurality of peaks of the second detection data W1b to the energies of the plurality of peaks of the first detection data W1a.

Next, in step S35, from the differences of the plurality of detection times and the differences of the plurality of energies calculated in step S34, a variance of the differences of the plurality of detection times and a variance as a fourth variation index of the differences of the plurality of energies are calculated.

Next, in step S36, the combination, which has the smallest variance value among the plurality of variance values of the detection times and the plurality of variance values of the energies obtained in step S33 to step S35, is selected.

Finally, in step S37, the plurality of peaks of the first detection data W1a and the plurality of peaks of the second detection data W1b are regarded as belonging to the same vehicle, and are extracted as the peaks for one vehicle.

The flow of the vehicle detection method is ended.

According to the vehicle detection method as described above, in addition to the selection processing of the combinations based on the detection times in the first embodiment, by calculating the differences in energy between the energies of the plurality of first peaks and the energies of the plurality of second peaks in order of the detection times for each of the combinations of the peaks and calculating the variance value of the differences in energy, the most appropriate combination based on energy can be selected. Thereby, even when a passage speed of the vehicle 4 changes between the first acceleration sensor 2a and the second acceleration sensor 2b, it is possible to detect the vehicle with higher accuracy.

Hereinafter, the contents derived from the embodiments will be described.

A vehicle detection method includes: acquiring a first output of a first sensor that detects vibrations of a structure and a second output of a second sensor that detects vibrations at a location different from a location of the first sensor on the structure; detecting a plurality of peaks of the first output and detection times of the plurality of peaks of the first output; detecting a plurality of peaks of the second output and detection times of the plurality of peaks of the second output; extracting a plurality of first peaks for one vehicle moving on the structure from the plurality of peaks of the first output; extracting a plurality of second peaks for the one vehicle moving on the structure from the plurality of peaks of the second output; assuming that the number of the plurality of first peaks is n and the number of the plurality of second peaks is m, when n is larger than m, creating nCm first combinations of the peaks from the plurality of first peaks, calculating first differences between detection times of the plurality of first peaks and detection times of the plurality of second peaks in order of the detection times for each combination of the first combinations, calculating first variation indexes of the first differences for each combination of the first combinations, and selecting a combination of the peaks having the smallest first variation index among the first combinations; and when n is smaller than m, creating mCn second combinations of the peaks from the plurality of second peaks, calculating second differences between detection times of the plurality of first peaks and detection times of the plurality of second peaks in order of the detection times for each combination of the second combinations, calculating second variation indexes of the second differences for each combination of the second combinations, and selecting a combination of the peaks having the smallest second variation index among the second combinations.

According to the method, when the number n of the plurality of first peaks is different from the number m of the plurality of second peaks due to an influence of disturbance such as noise and resonance, by developing mCn or nCm combinations, calculating differences between the detection times of the plurality of first peaks and the detection times of the plurality of second peaks in order of the detection times for each of the combinations of the peaks, and calculating a variance value of the differences, the most appropriate combination can be selected, and thus it is possible to detect that the vehicle detected by the first sensor and the vehicle detected by the second sensor are the same. Therefore, erroneous detection of the vehicle and detection failure of the vehicle can be reduced. Accordingly, it is possible to detect the vehicle with high accuracy.

The vehicle detection method may further include: calculating magnitudes of energies of the plurality of first peaks and magnitudes of energies of the plurality of second peaks; calculating, when n is larger than m, third differences between the magnitudes of the energies of the plurality of first peaks and the magnitudes of the energies of the plurality of second peaks in order of the detection times for each combination of the first combinations, and calculating third variation indexes of the third differences for each combination of the first combinations; and calculating, when n is smaller than m, fourth differences between the magnitudes of the energies of the plurality of first peaks and the magnitudes of the energies of the plurality of second peaks in order of the detection times for each combination of the second combinations, and calculating fourth variation indexes of the fourth differences for each combination of the second combinations.

According to the method, in addition to the selection processing of the combinations based on the detection times, by calculating the differences in energy between the energies of the plurality of first peaks and the energies of the plurality of second peaks in order of the detection times for each of the combinations of the peaks and calculating the variance value of the differences in energy, the most appropriate combination based on energy can be selected. Thereby, even when a passage speed of a moving object changes between the first sensor and the second sensor, it is possible to detect the vehicle with higher accuracy.

In the vehicle detection method, the vehicle may have three or more axles, and the extracting the plurality of first peaks and the extracting the plurality of second peaks may include extracting the plurality of first peaks and the plurality of second peaks, which are detected within a time between a minimum time and a maximum time of a time required for a plurality of the axles to pass the first sensor or the second sensor.

According to the method, in the extracting the plurality of first peaks and the extracting the plurality of second peaks, the plurality of first peaks and the plurality of second peaks for one vehicle can be extracted based on a limitation by the minimum time and the maximum time. Thus, in the combination processing, errors in the number of peaks can be reduced. Therefore, it is possible to detect the vehicle with higher accuracy.

In the vehicle detection method, the first sensor and the second sensor may be acceleration sensors.

According to the method, the acceleration sensors having a sensitivity higher than that of another sensor are used, and thus data can be acquired at a high sampling frequency. Therefore, even when a traveling speed of the vehicle is fast, the axles can be detected, and thus it is possible to detect the vehicle with higher accuracy.

What is claimed is:

1. A vehicle detection method for identifying a number of axles of each passing-by vehicle and determining a total number of passing-by vehicles, comprising:

acquiring a first output of a first sensor that detects vibrations of a structure and a second output of a second sensor that detects vibrations at a location different from a location of the first sensor on the structure, wherein the vibrations are generated by one or more vehicles that have passed over the structure, and each of the one or more vehicles can have any number of axles;

detecting a plurality of peaks of the first output and detection times of the plurality of peaks of the first output, each peak of the first output corresponding to an axle of the one or more vehicles that has passed over the first sensor;

detecting a plurality of peaks of the second output and detection times of the plurality of peaks of the second output, each peak of the second output corresponding to an axle of the one or more vehicles that has passed over the second sensor; and determining a number of vehicles that have passed over the structure based on the detections of the first sensor and the second sensor and, the determination of the number of vehicles that have passed over the structure comprising:

extracting a first number n of first peaks for one vehicle moving on the structure from the plurality of peaks of the first output;

extracting a second number m of second peaks for the one vehicle moving on the structure from the plurality of peaks of the second output; and when n is larger than m, creating nCm first combinations of the peaks from the plurality of first peaks, wherein nCm=n!/m!(n−m)!$^\Delta$ calculating first differences between detection times of the plurality of first peaks and detection times of the plurality of second peaks in order of the detection times for each combination of the first combinations, calculating first variation indexes of the first differences for each combination of the first combinations, selecting a combination of the peaks having the smallest first variation index among the first combinations, and determining that the selected combination of the peaks are generated by a single vehicle having m axles; and when n is smaller than m, creating mCn second combinations of the peaks from the plurality of second peaks, wherein mCn=m!/n!(m−n)!$^\Delta$ calculating second differences between detection times of the plurality of first peaks and detection times of the plurality of second peaks in order of the detection times for each combination of the second combinations, calculating second variation indexes of the second differences for each combination of the second combinations, selecting a combination of the peaks having the smallest second variation index among the second combinations, and determining that the selected combination of the peaks are generated by a single vehicle having n axles.

2. The vehicle detection method according to claim 1, further comprising:

calculating magnitudes of energies of the plurality of first peaks and magnitudes of energies of the plurality of second peaks;

when n is larger than m, calculating, third differences between the magnitudes of the energies of the plurality of first peaks and the magnitudes of the energies of the plurality of second peaks in order of the detection times for each combination of the first combinations, calculating third variation indexes of the third differences for each combination of the first combinations; and when n is smaller than m, calculating, fourth differences between the magnitudes of the energies of the plurality of first peaks and the magnitudes of the energies of the plurality of second peaks in order of the detection times for each combination of the second combinations, calculating fourth variation indexes of the fourth differences for each combination of the second combinations.

3. The vehicle detection method according to claim 1, wherein the vehicle has three or more axles, and the extracting the plurality of first peaks and the extracting the plurality of second peaks include extracting the plurality of first peaks and the plurality of second peaks, which are detected within a time between a minimum time and a maximum time of a time required for a plurality of the axles to pass the first sensor or the second sensor.

4. The vehicle detection method according to claim 1, wherein the first sensor and the second sensor are acceleration sensors.

* * * * *